Figure 1:
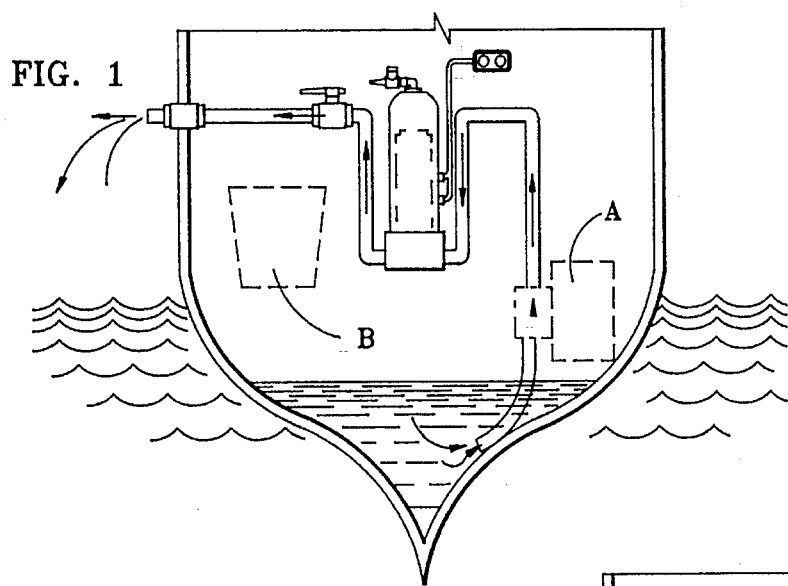

United States Patent [19]
Peterson et al.

[11] Patent Number: 5,474,672
[45] Date of Patent: Dec. 12, 1995

[54] BILGEWATER PURIFICATION DEVICE

[76] Inventors: Charles E. Peterson, P.O. Box 5597, Essex Junction, Vt. 05453; Pepe J. Nuzzolo, 28 Fourth St., Fair Haven, Vt. 05743

[21] Appl. No.: 312,210
[22] Filed: Sep. 26, 1994
[51] Int. Cl.$^6$ .................................................. B01D 35/30
[52] U.S. Cl. .............................. 210/85; 210/94; 210/103; 210/314; 210/DIG. 5
[58] Field of Search ..................... 210/85, 86, 94, 210/103, 104, 109, 110, 265, 266, 299, 302, 305, 307, 314, 540, DIG. 5, 96.1

[56] References Cited

U.S. PATENT DOCUMENTS

| | | |
|---|---|---|
| 3,425,556 | 2/1969 | Volker .................................... 210/104 |
| 3,852,193 | 12/1974 | Jakubek et al. .......................... 210/104 |
| 3,992,297 | 11/1976 | Baughcom et al. ..................... 210/104 |
| 4,032,444 | 6/1977 | Wright et al. ............................ 210/104 |
| 4,608,160 | 8/1986 | Zoch . | 
| 4,802,978 | 2/1989 | Schmit et al. ........................... 210/104 |

*Primary Examiner*—Joseph W. Drodge
*Attorney, Agent, or Firm*—John J. Welch, Jr.

[57] ABSTRACT

The instant device serves to remove petroleum substances from pumped bilgewater in small boats. Bilgewater under pressure is pumped into a media housing chamber after having first passed into a filter housing chamber containing polyethylene beads that separate the petroleum substances from water. The purified water under pressure is pumped out of the media housing chamber. When petroleum product that is so separated builds up in concentration to a certain critical level, an electrical sensing component is activated serving to notify a person to open a petroleum product outline control valve on the media housing chamber and to close an outflow control valve on outflow piping attached to he media housing chamber in order to permit such petroleum substances to be pumped away into a collecting pan. Once such substances are pumped away, the electrical sensing component is reset, the petroleum product outlet valve is closed and the outflow control valve is reopened in anticipation of further subsequent bilgewater purification.

16 Claims, 5 Drawing Sheets

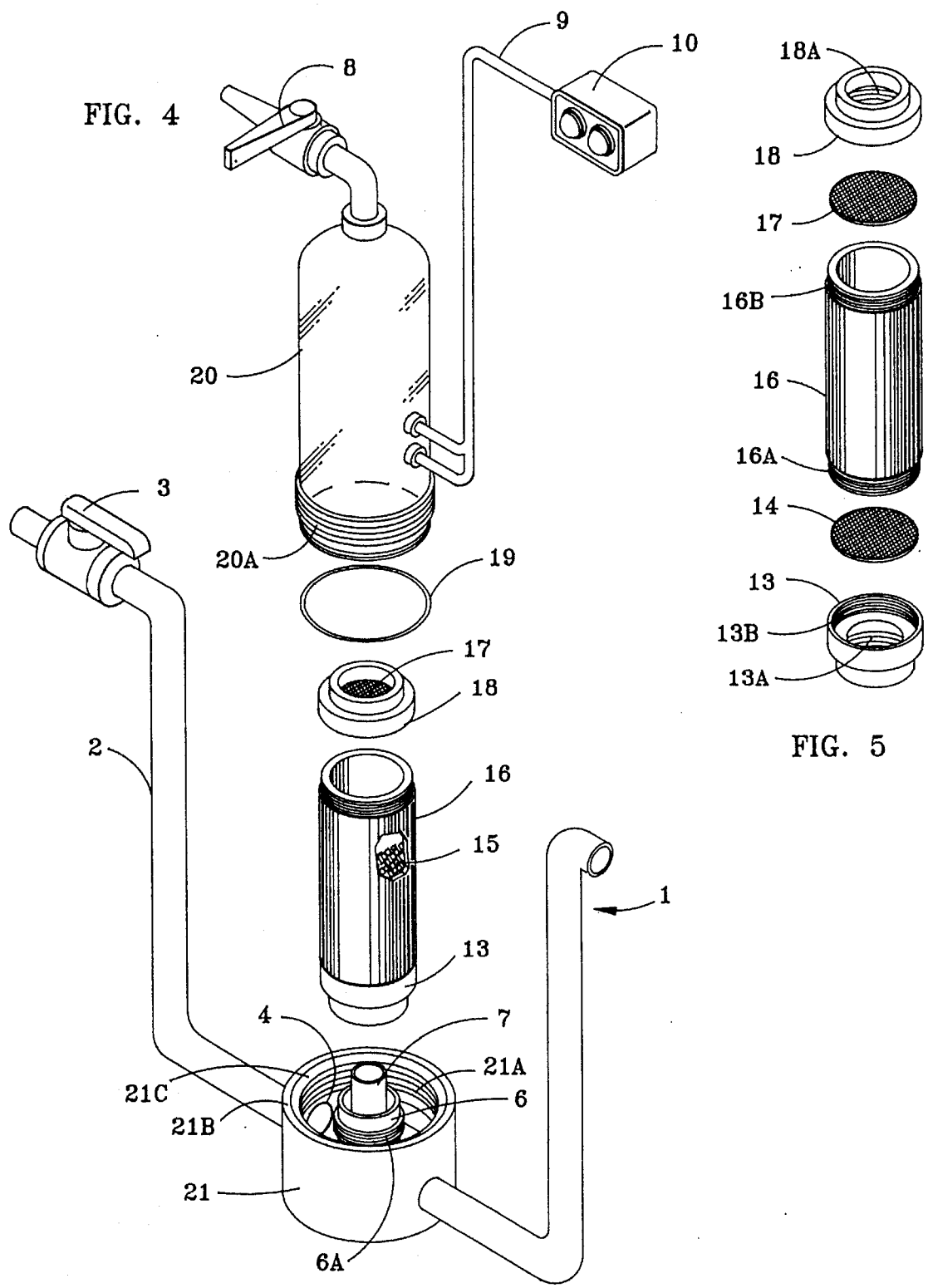

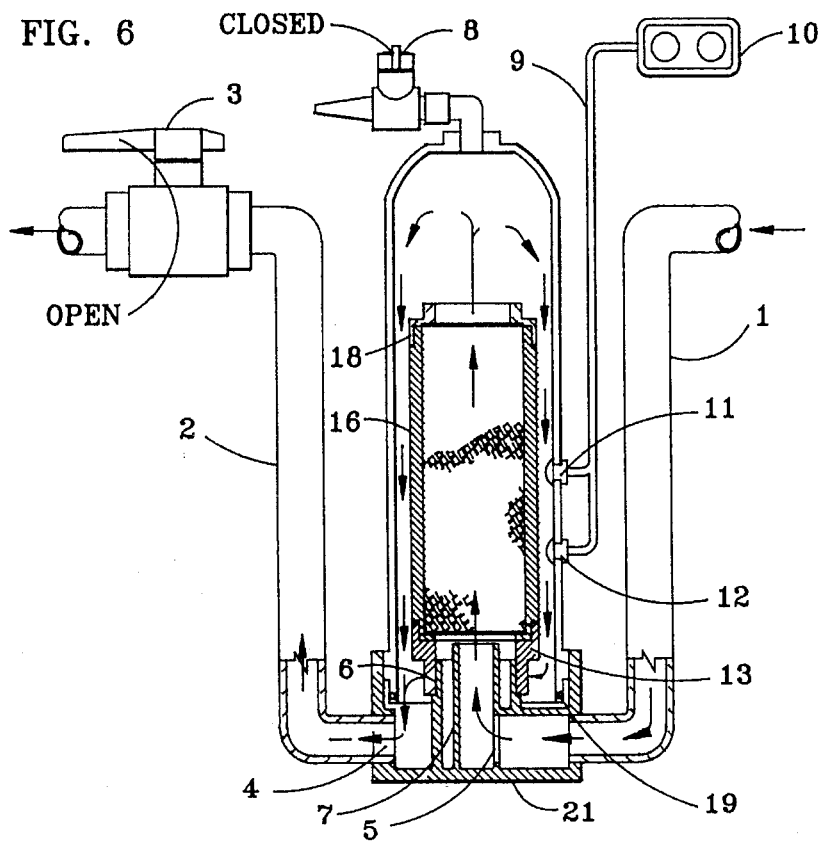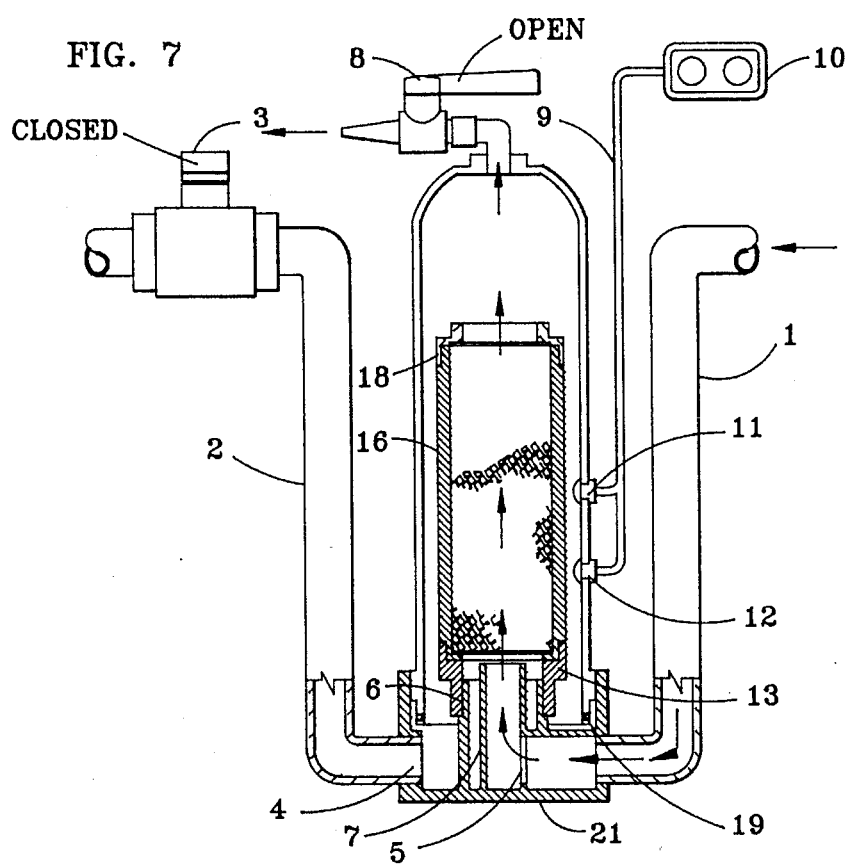

5,474,672

BILGEWATER PURIFICATION DEVICE

BACKGROUND OF THE INVENTION

1. Field of the Invention

This instant invention is one of those particular devices that serves to separate, by way of filtration technology, oil from water.

2. Possible Prior Art

The following art may resemble somewhat the instant invention but does not anticipate it:

1. *System for Separating Liquids,* Zoch, U.S. Pat. No. 4,608,160 issue Aug. 26, 1986.
2. The Racor Parker Filtration Unit described in the publication entitled "Marine Filtration Systems and Related Products".

A SUMMARY OF THE INVENTION

1. A Brief Description of the Invention

The instant invention meant to be held within a small boat consists of a unique combination of intake piping, a media housing chamber equipped with a petroleum product outlet valve, polyethylene filtering beads held in a filter chamber located within the media housing chamber, an electronic sensing unit and outlet piping connected to the media housing chamber and equipped with an outflow control valve. Bilgewater in such a small boat is pumped via the intake piping through the beads in the filter chamber where the petroleum product in such bilgewater is ultimately separated from the water by virtue of the coalescence of such petroleum product on and about the surface areas of each of such polyethylene beads. The water then passes into the media housing chamber. As such bilgewater is continuously pumped into the media housing chamber after the petroleum product has been separated via the beads away from it, and cleansed water is concomitantly pushed out of the boat through the outlet piping, the concentration of petroleum products in and about the beads in the filter housing chamber builds up. When the concentration of petroleum products within and about the beads within the filter chamber gets too high for the beads to so hold any more of the same, then, petroleum product droplets begin to emanate therefrom and start floating up into the media housing chamber since such petroleum product substance is less dense than water. And, when such petroleum product in the media housing chamber reaches a certain critical level of concentration, the electronic sensing unit detects such buildup and emits a signal to such effect. Upon receipt of said signal, a person in the boat turns the outflow control valve to the off position and opens the previously closed petroleum product outlet valve. The pressure from the pump then forces the petroleum product in the media housing chamber through the petroleum product outlet valve into a collecting pan for its ready disposal at some later time ultimately at a hazardous waste dumping site. When the concentration of petroleum product in the media housing chamber drops to an initial level, then the sensing unit is reset, the petroleum product outlet valve is closed, the outflow control valve is reopened and the process of purification of bilgewater under pump pressure continues.

2. The Object of the Invention

In this day and age of legitimate concern for the preservation of the quality of our environment and particularly the purity of our waters, it is undeniably desirable to accomplish, as best possible, a minimization of the dumping of non-biodegradable petroleum substances into our waterways. At present, bilgewater, to wit, water mixed with petroleum substances from i.e., a boat motor located above the bottom of the boat that leach therefrom down into water having collected over time in the bottom of the boat is simply pumped off those boats and into the body of water holding such boats. There currently exists no efficacious way of filtering away from such pumped bilgewater, within such small boats, the petroleum substances therein to be found. As one can readily imaging, such pumped out bilge water is indeed a ready source of significant water pollution.

The instant invention is not only novel and unique but, respectfully submitted, it is unquestionably useful in that it readily and virtually totally obviates water pollution otherwise resulting from small boat bilgewater pumping. If all small craft were equipped with the instant invention, a significant source and cause of water pollution unquestionably detrimental to aquatic plant and animal species and ultimately humans as well would be readily and expeditiously foreclosed.

A BRIEF DESCRIPTION OF THE DRAWINGS

1. FIG. 1 is a cutaway frontal view of a boat cutaway showing bilgewater being pumped through the instant invention and after having undergone petroleum product-water separation then being pumped out of the boat as relatively pure water. A petroleum product outlet valve is shown closed and an outflow control valve is shown open.

Figure 2:
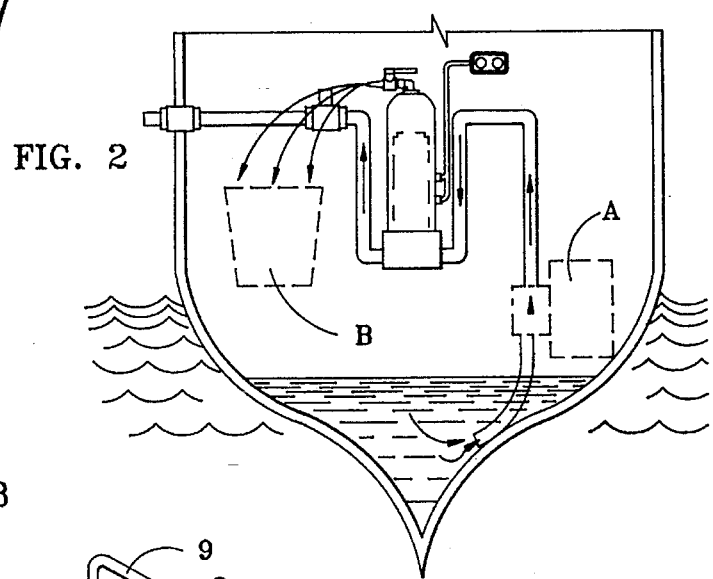

2. FIG. 2 is a view similar to that of FIG. 1 except that the petroleum product outlet valve is shown open and the outflow control valve is shown closed as concentrated petroleum product is directed under bilge pump pressure to an onboard collection pan.

Figure 3:
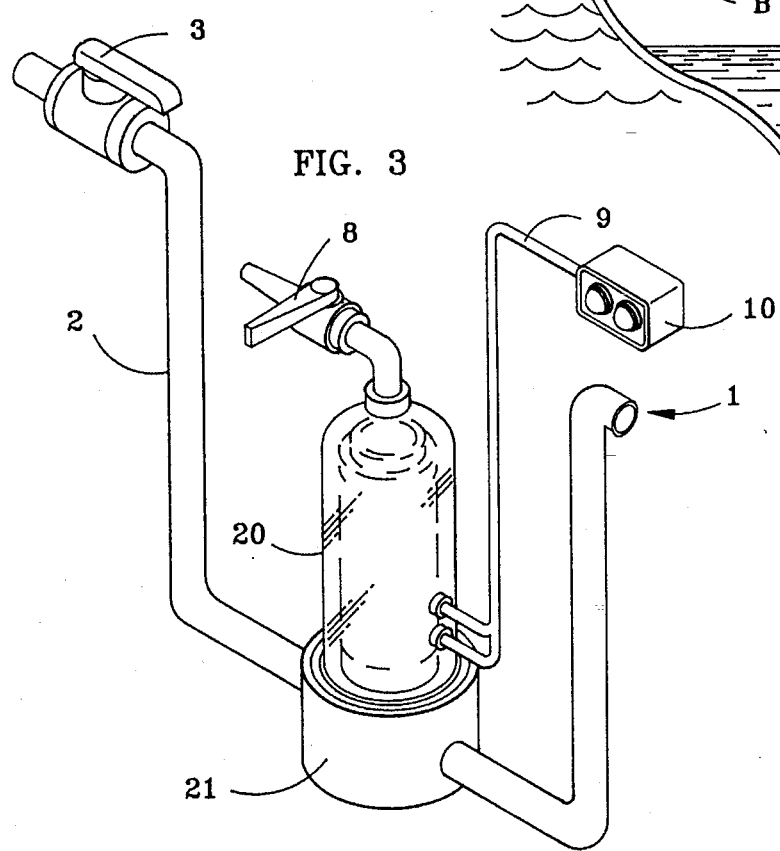

3. FIG. 3 is a perspective view of the instant invention.

4. FIG. 4 is an exploded view of the instant invention.

5. FIG. 5 is an exploded view of the filter housing component of the instant invention showing its various parts.

6. FIG. 6 is an isolated cross-sectional view of the instant invention showing by way of arrows, bilgewater being pumped into the media housing chamber component of the invention having first passed through the invention's filter chamber component and beads, and then ultimately passing out through outlet piping. The invention's petroleum product outlet valve is shown as closed. Its outflow control valve is shown as open.

7. FIG. 7 is an isolated cross-sectional view of the instant invention showing by way of arrows, petroleum product concentrate being pumped under pressure out an open petroleum product outlet valve. The invention's petroleum product outlet valve is shown as open. It's outflow control valve is shown closed.

Figure 8:
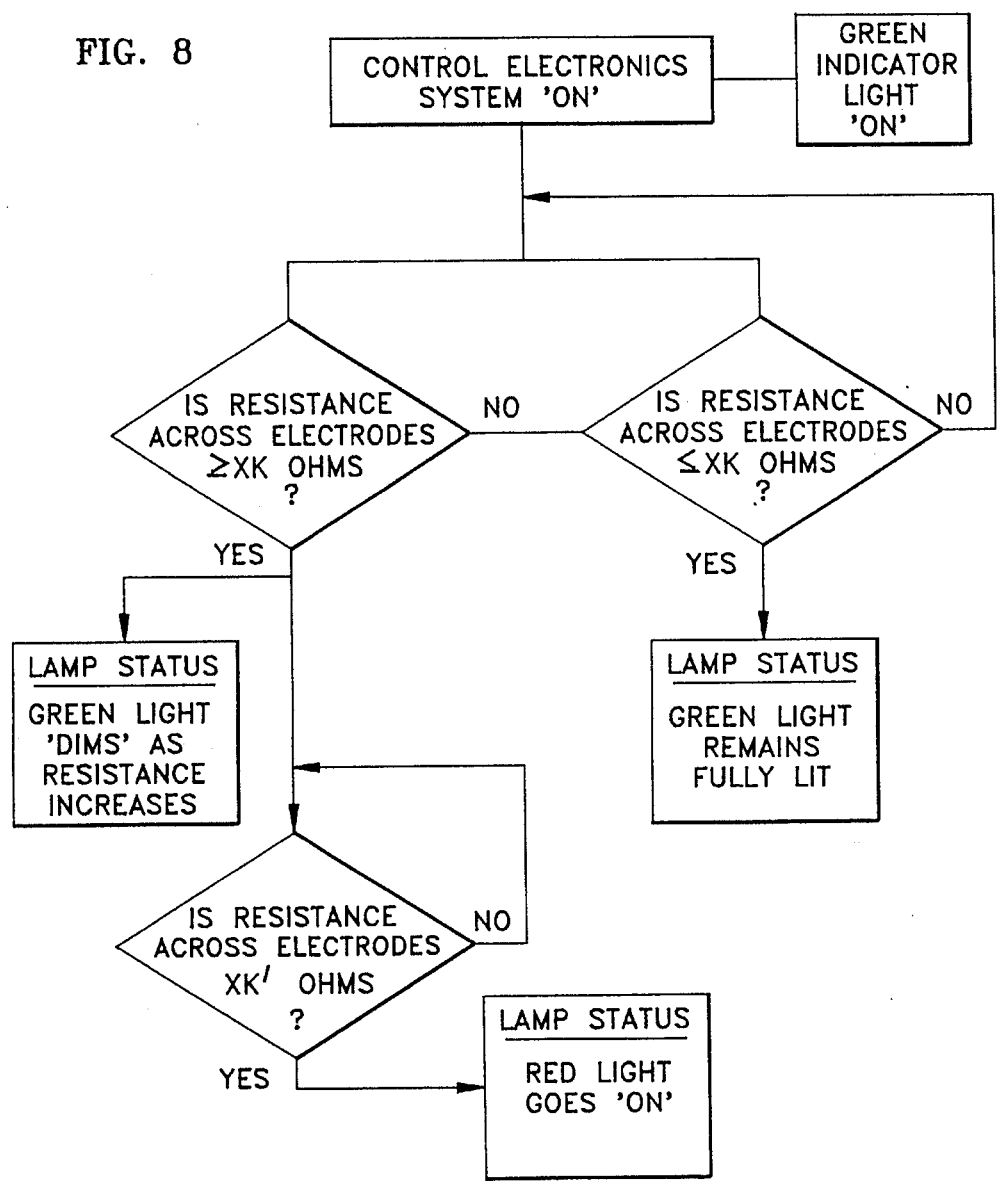

8. FIG. 8 shows the command format for the instant invention's electronic sensing component.

Figure 9:
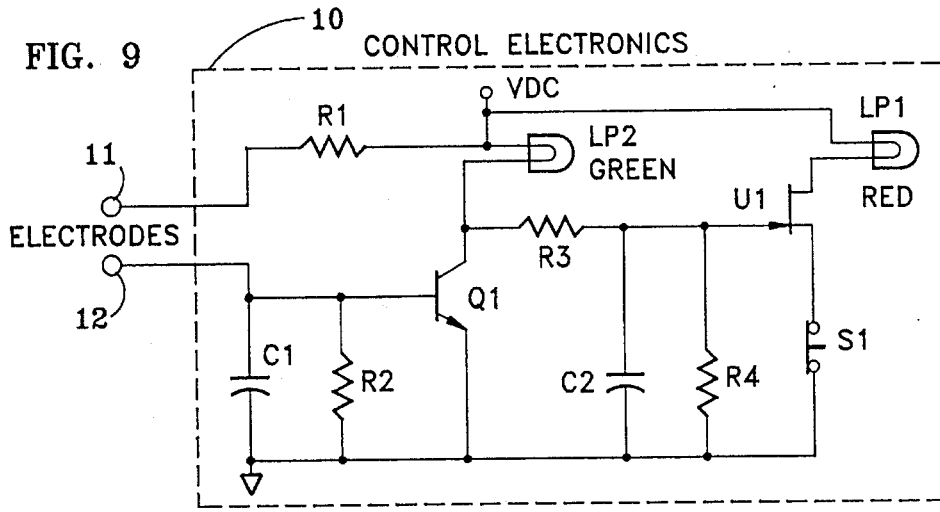

9. FIG. 9 is a schematic drawing of the invention's control electronics.

Figure 10:
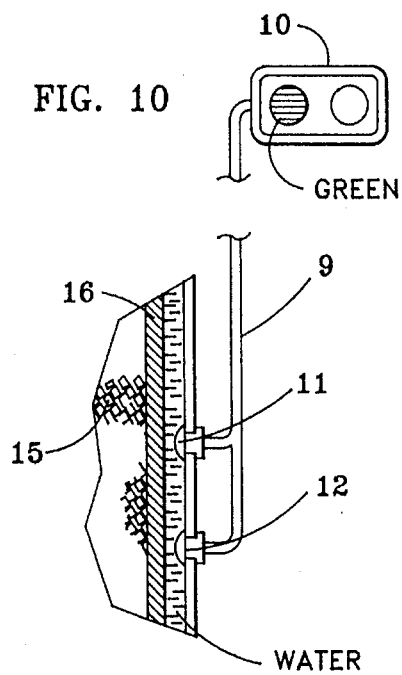

10. FIG. 10 is an isolated cross-sectional view illustrating how mobile bilgewater within the instant invention's media housing chamber component comes into contact with the electronic sensing component of the invention. In this figure, the concentration of petroleum product within the invention's media housing chamber is not high enough to actuate sensor activity.

Figure 11:
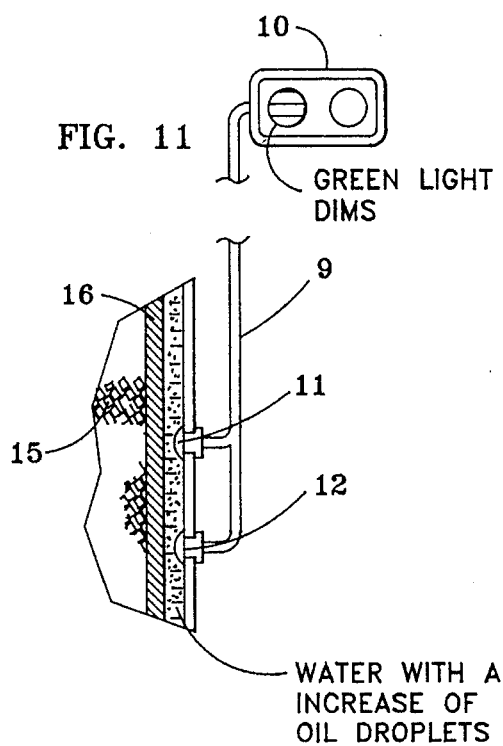

11. FIG. 11 is an isolated cross-sectional view illustrating how mobile bilgewater within the instant invention's media housing chamber component comes into contact with the electronic sensing component of the invention. In this figure, the concentration of petroleum product within the invention's media housing chamber is high enough to actuate sensor activity.

Figure 12:
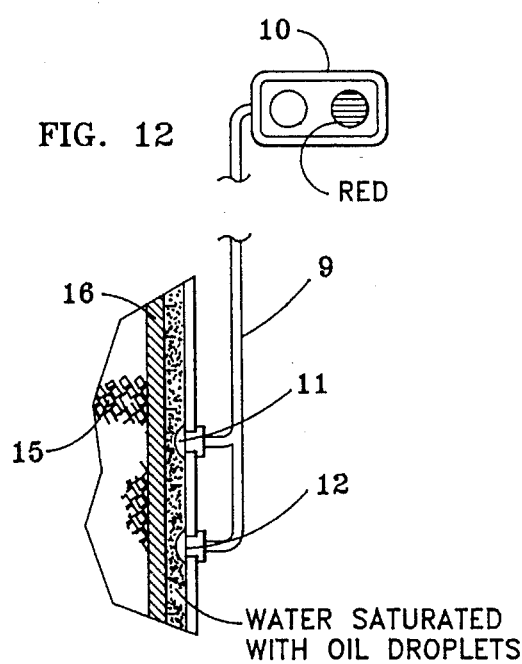

12. FIG. 12 is an isolated cross-sectional view illustrating how mobile bilgewater within the invention's media chamber comes into contact with the electrical sensing component of the invention. In this figure, the concentration of petroleum product in the invention's media housing chamber is high enough to consummate sensor activity.

A DESCRIPTION OF THE PREFERRED EMBODIMENT

Bilgewater is water collected over time in the bottom of a boat, in the instant case, a small boat that becomes contaminated with petroleum substances leaching into it from, for example, the bottom of a boat motor situate within such a small boat above the reservoir of bilgewater. Such water originates as rainwater or, for instance as waves or sprays of water that overlap the sides of a small boat over time only to collect in the bottom of such a boat. At present, a pump such as pump A shown in FIG. 1 merely pumps with pressure such contaminated water into a lake or other body of water wherein such a boat can be found. FIG. 1 shows the instant device situated between pump A and outflow piping leading into a lake. FIG. 3 is a perspective view of the instant device showing inflow piping 1, chamber base 21, media housing chamber 20, petroleum product outlet valve assembly 8, sensor tubing 9 connected to sensor display panel 10, outlet piping 2 and outflow control valve assembly 3; all integral components of the instant invention. FIG. 4 is an exploded perspective view of the instant device. Inflow piping 1 connected to chamber base 21 carries bilgewater pumped by pump A to hollow uptake piping 7 located in chamber base 21 via a hole 5 shown in FIG. 6. Such contaminated bilgewater then proceeds under such pressure into filter housing chamber 16 shown in FIG. 4 and shown fully assembled in FIGS. 6 and 7. Housing chamber 16 is affixed to filter housing chamber base 13 via external threading 16A that is rotatably received by internal threading 13B located within the upper portion of base 13 which said threading is shown in FIG. 5 after threading 6 found on the exterior part of that centralized cylindrically shaped encasement of piping 7 which like piping 7 is a part of chamber base 21, is rotatably received by internal threading 13A as seen in FIG. 5. Filter screen 14 shown in FIG. 5 fits into filter housing chamber base 13. As is further seen in FIG. 5, filter housing chamber 16 houses polyethylene beads 15 seen in FIG. 5 after chamber 16 is via threading 16B located at its base, rotatably received atop filter screen 14 by internal threading 13B located within the upper portion of base 13. Filter screen 17 seen in FIGS. 4 and 6 fits atop chamber 16 and filter cap 18 via threading 18A located at its base is rotatably received atop screen 17 by threading 16B found at the top portion of chamber 16. The result of the foregoing is the complete assembly of the filter housing component of the instant device. As per FIG. 4, an O ring 19 rests atop base 21 to seal the juncture between the top shelf 21B of base 21 located just below top edge 21C of base 21, and the portion of media housing chamber 20 located just above threading 20A found at the base of chamber 20 after chamber 20 is rotatably received by threading 21A located within base 21 as seen in FIG. 4. The result of the foregoing is the complete assembly of the media housing component of the instant device with concomitant complete encasement of the filter housing component of the instant invention as can be seen in FIGS. 6 and 7. Chamber 20 as disclosed by FIG. 4 is equipped with petroleum product outlet valve assembly 8 and has affixed to it electrodes 11 and 12 shown in FIG. 7 connected via sensor tubing 9 to sensor display panel 10 as seen in FIG. 4. A hole 4 in the bottom of chamber 21 is seen in FIGS. 4, 6 and 7.

As can be seen in FIG. 6, once such bilgewater under pressure from pump A has via uptake piping 7 passed through filter screen 14, reached filter housing chamber 16 and then passed about and through polyethylene beads 15, petroleum product within the water is trapped by beads 15 by virtue of progressive coalescence of such petroleum product over time upon and about the surface areas of each of such beads 15, and concomitantly, relatively purified water then continues to flow through beads 15 now in purer form through filter screen 17 and into the body of media housing chamber 20. Such relatively purified water then after having filled chamber 20 as can also be seen in FIG. 6 continues under pressure from pump A out through hole 4 into outflow piping 2 and via open outflow control valve assembly 3 into the lake or other body of water wherein the boat containing the bilgewater and the instant invention is found. With continuing pumping and continuing buildup of petroleum substances on beads 15 by virtue of the phenomenon of such coalescence as noted above, eventually petroleum product droplets begin to form over beads 15 from an aggregation of such petroleum substances over time over beads 15. These droplets being less dense than water begin to form a film of petroleum product above bilgewater continually found in chamber 20. But, when such film builds up over time to the extent that its dispersion throughout chamber 20 is critically notable, then electrodes 11 and 12 via connections to sensor display panel 10 which said connections are held within sensor tubing 9 cause a signal on display panel 10 to notify an operator of the boat to turn outflow control valve assembly 3 to the closed position and to then turn petroleum product outlet valve assembly 8 to the open position to thereby prevent the built up petroleum product slick from reaching the lake and passing instead via valve assembly 8 to a collecting pan B located within the boat, all as can be appreciated with resort to FIGS. 2, 7 and 12. Once, the petroleum product slick has been collected as noted above, then, a deactivation switch which is a part of the instant invention's electrical sensing system component is thrown and outflow control valve assembly 3 is returned again to the open position and petroleum product outlet valve assembly 8 is returned again to the closed position thereby allowing once again for continual dispersal of relatively petroleum product free filtered bilgewater into the lake. The instant invention's electrical sensing system component operates on the basis that as current is conducted via relatively clear water, a conductor, as between electrodes 11 and 12, such conductivity prompts a particular first signal to be registered on display panel 10. However, when there is a sufficient build up of petroleum substances in the vicinity of electrodes 11 and 12, such substances, being substances with inherent resistance, interrupt the flow of such current between electrodes 11 and 12 which interruption prompts a different second signal to be registered on display panel 10 with concomitant diminution of the first signal. The abovenoted first signal could take the form of a signal causing a small bulb encased within green glass to light up and stay lit or one that serves to actuate any indicator. The abovenoted second signal could take the form of a signal causing a small bulb encased within red glass to light up and stay lit until a manual resetting of a deactivation switch would terminate this signal and prompt resumption of the first signal or it could take the form of one that actuates an alarm device such as a buzzer or a bell until such resetting of the switch upon resumption of conductivity as between electrodes 11 and 12 would terminate this signal and prompt resumption of the first signal. Two light signals; one red, one green as noted above would be found to compliment one another in one embodiment of the invention and a non-actuating signal would complement an alarm signal in another embodiment of the invention. FIG. 8 is a flow chart diagram of the invention's control electronics boxed behind display panel 10. If the resistance across electrodes 11 and 12 is less than x kilohms, then, the green light on display panel 10 stays on. Lake or sea water will evidence conductivity that will allow for the passage of current. FIG. 10 evidences the lighting of a green light on display panel 10 when the resistance across electrodes 11 and 12 is less than x kilohms. A figure of 5 kilohms is one that fairly equates with x. The presence of significant amounts of oil droplets in such water as seen in FIG. 11 indicates a rise in resistance and a drop in conductivity across electrodes 11 and 23, to wit, an increase in resistance towards a level of 5 kilohms that causes the green light on panel 10 to grow dim. At a resistance level of 5 or more kilohms, there is a sufficient concentration of oil droplets within remnant bilgewater within media housing chamber 20 having been pumped through beads 15 that have become saturated with petroleum product as previously noted, that resistance across electrodes 11 and 12 equals or exceeds 5 kilohms causing the green light to go out and the red light adjacent thereto as seen in FIG. 12 to go on. FIG. 9 is a schematic diagram of the invention's control electronics. Assuming a voltage drop from VDC to ground of 12 volts, values $R_1$, $R_2$, $R_3$ and $R_4$ thereon shown and equal to 3.9 kilohms, 10 kilohms, 10 kilohms and 4.7 kilohms respectively facilitate the action described above in accordance with the level of resistance across electrodes 11 and 12. $C_1$ and $C_2$ are capacitors that serve to filter out interfering electrical signals, for example, radio frequency signals that could disrupt the working capabilities of these four resistors working together with transistor $Q_1$ and a silicone controlled rectifier $U_1$, to facilitate the abovesaid electronic doings. $C_1$ and $C_2$ have values typically but not necessarily equal to 0.047 microfarads. $Q_1$ is a standard (TIP -31A) high current gain transistor whereby current reaching $Q_1$, is magnified typically one hundred fold to thus light green lamp LP2 on display panel 10. R1 divided by ($R_1$ plus $R_2$) all times VDC determines the voltage drop across $R_2$ to in turn determine the operating point at the base of $Q_1$ that lights LP2. As current conducted across electrodes 11 and 12 depreciates with increasing resistance thereat, current at the collector point of Q drops by a factor of 100 thereby causing LP2 to shine more dimly and collector voltage at the juncture of $Q_1$ and $R_4$ increases. In the event of such an occurrence, $R_4$ divided by ($R_3$ and $R_4$) all times such collector voltage causes $U_1$, a standard (CR 2 AM-8) silicone controlled rectifier previously when "off" and thereby acting like an open circuit to be activated and behave thereby like a diode conducting current to thus light LP1, the red light on display panel 10. The values of $R_1$, $R_2$, $R_3$, and $R_4$ would be roughly doubled if VDC were to be 24 volts and halved if VDC were to be 6 volts. Such control electronics is a vast improvement over any other similar metering system available serving to detect environmentally unacceptable petroleum product concentrations, since, all of the aforesaid components of such control electronics are inexpensive solid state devices readily capable of doing what would otherwise be done utilizing expensive intricate electrical relays. Finally, LP-1 once lit remains lit until deactivation switch $S_1$, is pushed to reopen the circuit and thereby cause LP-1 to go out as $U_1$ becomes, in effect, once again an open circuit and concomitantly LP-2 to relight assuming resistance across electrodes 11 and 12 to be then less than 5 kilohms.

What is claimed is:

1. A bilgewater purification device, comprising:

a. inflow piping;

b. a hollow, bulbous media housing chamber;

c. a petroleum product outlet valve assembly connected to said media housing chamber;

d. a hollow media chamber base with continuous walling affixed to a bottom side of said hollow media chamber base which said walling is connected to said inflow piping and with threading circumscribing the interior surface of said walling of said hollow media chamber base for receipt of external threading circumscribing the lowest portion of said media housing chamber serving thereby to connect said media housing chamber to said hollow media chamber base;

e. outflow piping connected to said walling of said hollow media chamber base;

f. a hole in said walling of said media chamber base leading directly into said outflow piping;

g. a water outflow valve assembly connected to said outflow piping;

h. hollow piping centrally positioned within said hollow media chamber base and affixed in part to said bottom side of said hollow media chamber base and affixed in part to said walling of said hollow media chamber base by way of bridging lying parallel to the plane of said bottom side of said hollow media chamber base;

i. a hole in said walling of said media chamber base leading directly into said inflow piping;

j. a two tiered filter housing chamber base, a first portion of which said filter housing chamber base located below the midline of said filter housing chamber base is circumscribed by primary internal threading and a second portion of which said filter housing chamber base located above the midline of said filter housing chamber base is circumscribed by secondary internal threading;

k. a hollow cylindrical encasement of said hollow piping centrally positioned with said media chamber base circumscribed by external threading for receipt of said filter housing chamber base via receipt of said primary internal threading;

l. a first filter screen positioned at and upon flooring of said second portion of said filter housing chamber base;

m. a filter housing chamber characterized by the presence of external threading circumscribing its external walling up to and in proximity with an upper rim and by the presence of external threading circumscribing its said external walling down to and in proximity with a lower rim;

n. a second filter screen positioned at and upon the upper rim of said filter housing chamber;

o. a plurality of beaded materials, on the surfaces of which petroleum product is able to coalesce which said beaded materials are located within said filter housing chamber between said first filter screen and said second filter screen;

p. a two tiered filter housing cap the lowest portion of which is characterized by the presence of internal threading circumscribing the interior walling of said filter housing cap in which said internal threading of said filter housing cap is received by said external threading circumscribing said external walling of said filter housing chamber up to and in proximity with said upper rim of said filter housing chamber;

q. a first electrode and a second electrode affixed to the walling of said media housing chamber such that each of said electrodes is amenable to contact with liquid within said media housing chamber;

r. connector wiring leading from each of said electrodes to control electronics;

s. a display panel characterized by the presence of a first signal emitter and a second signal emitter in which said display panel also houses said control electronics;

t. connector wiring leading from each of said signal emitters to said control electronics.

2. The bilgewater purification device of claim 1 wherein said first signal emitter lights a lamp of one color and said second signal emitter lights a lamp of a second color.

3. The bilgewater purification device of claim 1 whereby said first signal emitter causes either the emission of a nondetectable signal or the lighting of a lamp and said second signal emitter causes the emission of an audible sound.

4. The bilgewater purification device of claim 1 whereby said first signal emitter causes either the emission of a nondetectable signal or the lighting of a lamp and said second signal emitter lights a lamp.

5. A bilgewater purification device, comprising:

a. inflow piping;

b. a hollow, bulbous media housing chamber;

c. a petroleum product outlet valve assembly connected to said media housing chamber;

d. a hollow media chamber base with continuous walling affixed to a bottom side of said hollow media chamber base which said walling is connected to said inflow piping and with threading circumscribing the interim surface of said walling of said hollow media chamber base for receipt of external threading circumscribing the lowest portion of said media housing chamber serving thereby to connect said media housing chamber to said hollow media chamber base;

e. outflow piping connected to said walling of said hollow media chamber base;

f. a hole in said walling of said media chamber base leading directly into said outflow piping;

g. a water outflow valve assembly connected said outflow piping;

h. hollow piping centrally positioned within said hollow media chamber base and affixed in part to said bottom side of said hollow media chamber base and affixed in part to said walling of said hollow media chamber base by way of bridging lying parallel to the plane of said bottom side of said hollow media chamber base;

i. a hole in said walling of said media chamber base leading directly into said inflow piping;

j. a two tiered filter housing chamber base, a first portion of which said filter housing chamber base located below the midline of said filter housing chamber base is circumscribed by primary internal threading and a second portion of which said filter housing chamber base located above the midline of said filter housing chamber base is circumscribed by secondary internal threading;

k. a hollow cylindrical encasement of said hollow piping centrally positioned within said media chamber base circumscribed by external threading for receipt of said filter housing chamber base via receipt of said primary internal threading;

l. a first filter screen positioned at and upon flooring of said second portion of said filter housing chamber base;

m. a filter housing chamber characterized by the presence of external threading circumscribing its external walling up to and in proximity with an upper rim and by the presence of external threading circumscribing its said external walling down to and in proximity with a lower rim;

n. a second filter screen positioned at and upon the upper rim of said filter housing chamber;

o. a plurality of beaded materials, on the surfaces of which petroleum product is able to coalesce which said beaded materials are located within said filter housing chamber between said fist filter screen and said second filter screen;

p. a two tiered filter housing cap the lowest portion of which is characterized by the presence of internal threading circumscribing the interior walling of said filter housing cap in which said internal threading of said filter housing cap is received by said external threading circumscribing the said external walling up to and in proximity with said upper rim of said filter housing chamber;

q. a first electrode and a second electrode affixed to the walling of said media housing chamber such that each of said electrodes is amenable to contact with liquid within said media housing chamber;

r. connector wiring leading from each of said electrodes to control electronics;

s. a display panel characterized by the presence of a first signal emitter and a second signal emitter in which said display panel also houses said control electronics;

t. connector wiring leading from each of said signal emitters to said control electronics;

u. an O ring positionable about the highest portion of said external threading of said media housing chamber serving as a seal when said external threading of said media housing chamber is received by said threading circumstances said interior wall of said medica chamber base.

6. The bilgewater purification device of claim 5 whereby said first signal emitter lights a lamp of one color and said second signal emitter lights a lamp of a second color.

7. The bilgewater purification device of claim 5 whereby said first signal emitter causes either the emission of a nondetectable signal or the lighting of a lamp and said second signal emitter causes the emission of an audible sound.

8. The bilgewater purification device of claim 5 whereby said first signal emitter causes either the emission of a nondetectable signal or the lighting of a lamp and said second signal emitter lights a lamp.

9. A bilgewater purification device, comprising:

a. inflow piping;

b. a hollow, bulbous media housing chamber;

c. a petroleum product outlet valve assembly connected to said media housing chamber;

d. a hollow media chamber base with continuous walling affixed to a bottom side of said hollow media chamber base which said walling is connected to said inflow piping and with threading circumscribing the interior surface of said walling of said hollow media base for receipt of external threading circumscribing the lowest portion of said media housing chamber serving thereby to connect said media housing chamber to said hollow media chamber base;

e. outflow piping connected to said walling of said hollow media chamber base;

f. a hole in said walling of said media chamber base leading directly into said outflow piping;

g. a water outflow valve assembly connected to said outflow piping;

h. hollow piping centrally positioned within said hollow media chamber base and affixed in part to said bottom side of said hollow media chamber base and affixed in part to said walling of said hollow media chamber base by way of bridging lying parallel to the plane of said bottom side of said hollow media chamber base;

i. a hole in said walling of said media chamber base leading directly into said inflow piping;

j. a two tiered filter housing chamber base, a first portion of which said filter housing chamber base located below the midline of said filter housing chamber base is circumscribed by primary internal threading and a second portion of which said filter housing chamber base located above the midline of said filter housing chamber base is circumscribed by secondary internal threading;

k. a hollow cylindrical encasement of said hollow piping centrally positioned within said media chamber base circumscribed by external threading for receipt of said filter housing chamber base via receipt of said primary internal threading;

l. a first filter screen positioned at and upon flooring of said second portion of said filter housing chamber base;

m. a filter housing chamber characterized by the presence of external threading circumscribing its external waling up to and in proximity with an upper rim and by the presence of external threading circumscribing its said external waling down to and in proximity with a lower rim;

n. a second filter screen positioned at and upon the upper rim of said filter housing chamber;

o. a plurality of beaded materials, on the surfaces of which petroleum product is able to coalesce which said beaded materials are located within said filter housing chamber between said first filter screen and said second filter screen;

p. a two tiered filter housing cap the lowest portion of which is characterized by the presence of internal threading circumscribing the interior walling of said filter housing cap in which said internal threading of said filter housing cap is received by said external threading circumscribing the said external walling of said filter housing chamber up to and in proximity with said upper rim of said filter housing chamber;

q. a first electrode and a second electrode affixed to the walling of said media housing chamber such that each of said electrodes is amenable to contact with liquid within said media housing chamber;

r. first connector wiring leading from said first electrode to control electronics;

s. second connector wiring leading from said second electrode to said control electronics;

t. a display panel characterized by the presence of a first signal emitter and a second signal emitter in which said display panel also houses said control electronics;

u. third connector wiring leading from said first signal emitter to said control electronics;

v. fourth connector wiring leading from said second signal emitter to said control electronics;

w. said control electronics being an electrical circuit characterized by the presence of a first resistor connected by said first connector wiring to said first electrode and with said first resistor, likewise connected by wiring to a first electrical junction point in turn connected to said second signal emitter via said fourth connector wiring and with other wiring connecting said first electrical junction point to a second electrical junction point in turn connected via said third connector wiring to said first signal emitter and with said fourth connector wiring connecting said second signal emitter to a third electrical junction point and with said third connector working connecting said first signal emitter to a silicone controlled rectifier, and with wiring connecting said third electrical junction point to a standard high current gain transistor and with wiring connecting said transistor to a fourth electrical junction point and with further wiring connecting said transistor to a fifth electrical junction point and with further wiring connecting said fourth electrical junction point to a sixth electrical junction point connected to said second electrode via said second connector wiring and with wiring connecting said sixth electrical junction point to a first capacitor in turn connected by wiring to a seventh electrical junction point in turn connected to an eighth electrical junction point connected by wiring to a second resistor in turn connected by wiring to said fourth electrical junction point with said eighth electrical junction point in turn connected by other wiring to said fifth electrical junction point and with said third electrical junction point connected by wiring to a third resistor connected in turn by wiring to a ninth electrical junction point in which said ninth electrical junction point is connected by wiring to a second capacitor in turn connected by wiring to a tenth electrical junction point and in which said ninth electrical junction point is connected by wiring to an eleventh electrical junction point in which said eleventh junction point is connected by wiring to a fourth resistor in turn connected by wiring to a twelfth electrical junction point also connected by wiring to said tenth electrical junction point with said eleventh electrical junction point connected by wiring to said silicone controlled rectifier in turn connected by wiring across a switch until to said twelfth junction point with said first resistor and said second resistor connected in series to control the voltage level at said transistor in order to initiate a first electrical signal from said first signal emitter when the resistance across each of said two electrodes is less than a designated number of kilohms and with said third resistor and said fourth resistor connected in series to control the voltage level at said standard silicone controlled rectifier in order to initiate a second electrical signal from said second signal emitter ultimately in lieu of said first electrical signal when the resistance across each of said two electrodes is more than a designated number of kilohms providing further for the deactivation of said second electrical signal upon engagement of said switch.

10. The bilgewater purification device of claim 9 whereby said first signal emitter lights a lamp of one color and said second signal emitter lights a lamp of a second color.

11. The bilgewater purification device of claim 9 whereby said first signal emitter causes either the emission of a nondetectable signal or the lighting of a lamp and said second signal emitter causes the emission of an audible sound.

12. The bilgewater purification device of claim 9 whereby said first signal emitter causes either the emission of a nondetectable signal or the lighting of a lamp and said second signal emitter lights a lamp.

13. A bilgewater purification device, comprising:

a. inflow piping;

b. a hollow, bulbous media housing chamber;

c. a petroleum product outlet valve assembly connected to said media housing chamber;

d. a hollow media chamber base with continuous walling affixed to a bottom side of said hollow media chamber base which said walling is connected to said inflow piping and with threading circumscribing the interior surface of said walling of said hollow media chamber base for receipt of external threading circumscribing the lowest portion of said media housing chamber serving thereby to connect said media housing chamber to said hollow media chamber base;

e. outflow piping connected to said walling of said hollow media chamber base;

f. a hole in said walling of said media chamber base leading directly into said outflow piping;

g. a water outflow valve assembly connected to said outflow piping;

h. hollow piping centrally positioned within said hollow media chamber base and affixed in part to said bottom side of said hollow media chamber base and affixed in part to said walling of said hollow media chamber base by way of bridging lying parallel to the plane of said bottom side of said hollow media chamber base;

i. a hole in said walling of said media chamber base leading directly into said inflow piping;

j. a two tiered filter housing chamber base, a first portion of which said filter housing chamber base located below the midline of said filter housing chamber base is circumscribed by primary internal threading and a second portion of which said filter housing chamber base located above the midline of said filter housing chamber base is circumscribed by secondary internal threading;

k. a hollow cylindrical encasement of said hollow piping centrally positioned within said media chamber base by external threading for receipt of said filter housing chamber base via receipt of said primary internal threading;

l. a first filter screen positioned at and upon flooring of said second portion of said filter housing chamber base;

m. a filter housing chamber characterized by the presence of external threading circumscribing its external walling up to and in proximity with an upper rim and by the presence of external threading circumscribing its said external walling down to and in proximity with a lower rim;

n. a second filter screen positioned at and upon the upper rim of said filter housing chamber;

o. a plurality of beaded materials, on the surfaces of which petroleum product is able to coalesce which said beaded materials are located within said filter housing chamber between said first filter screen and said second filter screen;

p. a two tiered filter housing cap the lowest portion of which is characterized by the presence of said internal threading circumscribing the interior walling of said filter housing cap in which said internal threading of said filter housing cap is received by said external threading circumscribing the said external walling of said filter housing chamber up to and in proximity with said upper rim of said filter housing chamber;

q. a first electrode and a second electrode affixed to the walling of said media housing chamber such that each of said electrodes is amenable to contact with liquid within said media housing chamber;

r. first connector wiring leading from said first electrode to control electronics;

s. second connector wiring leading from said second electrode to said control electronics;

t. a display panel characterized by the presence of a first signal emitter and a second signal emitter in which said display panel also houses said control electronics;

u. third connector wiring leading from said first signal emitter to said control electronics;

v. fourth connector wiring leading from said second signal emitter to said control electronics;

w. said control electronics being an electrical circuit characterized by the presence of a first resistor connected by said first connector wiring to said first electrode and with said first resistor, likewise connected by wiring to a first electrical junction point in turn connected to said second signal emitter via said fourth connector wiring and with other wiring connecting said first electrical junction point to a second electrical junction point in turn connected via said third connector wiring to said first signal emitter and with said fourth connector wiring connecting said second signal emitter to a third electrical junction point and with said third connector wiring connecting said first signal emitter to a silicone controlled rectifier, and with wiring connecting said third electrical junction point to a standard high current gain transistor and with wiring connecting said transistor to a fourth electrical junction point and with further wiring connecting said transistor to a fifth electrical junction point and with further wiring connecting said fourth electrical junction point to a sixth electrical junction point connected to said second electrode via said second connector wiring and with wiring connecting said sixth electrical junction point to a first capacitor in turn connected by wiring to a seventh electrical junction point in turn connected to an eighth electrical junction point connected by wiring to a second resistor in turn connected by wiring to said fourth electrical junction point with said eighth electrical junction point in turn connected by other wiring to said fifth electrical junction point and with said third electrical junction point connected by wiring to a third resistor connected in turn by wiring to a ninth electrical junction point in which said ninth electrical junction point is connected by wiring to a second capacitor in turn connected by wiring to a tenth electrical junction point and in which said ninth electrical junction point is connected by wiring to an eleventh electrical junction point in which said eleventh junction point is connected by wiring to a fourth resistor in turn connected by wiring to a twelfth electrical junction point also connected by wiring to said tenth electrical junction point with said eleventh electrical junction point connected by wiring to said silicone controlled rectifier in turn connected by wiring across a switch until to said twelfth junction point with said first resistor and said second resistor connected in series to control the voltage level at said transistor in order to initiate a first electrical signal from said first signal emitter when the resistance across each of said two electrodes is less than a designated number of kilohms and with said third resistor and said fourth resistor connected in series to control the voltage level at said standard silicone controlled rectifier in order to initiate a second electrical signal from said second signal emitter ultimately in lieu of said first electrical signal when the resistance across each of said two electrodes is more than a designated number of kilohms providing further for the deactivation of said second electrical signal upon engagement of said switch.

x. an O ring positionable about the highest portion of said external threading of said media housing chamber serving as a seal when said external threading of said media housing chamber is received by said threading circumscribing said interior wall of said media chamber base.

14. The bilgewater purification device of claim 13 whereby said first signal emitter lights a lamp of one color and said second signal emitter lights a lamp of a second color.

15. The bilgewater purification device of claim 13 whereby said first signal emitter causes either the emission of a nondetectable signal or the lighting of a lamp and said second signal emitter causes the emission of an audible sound.

16. The bilgewater purification device of claim 13 whereby said first signal emitter causes either the emission of a nondetectable signal or the lighting of a lamp and said second signal emitter lights a lamp.

* * * * *